United States Patent [19]
Kumar

[11] Patent Number: 5,835,850
[45] Date of Patent: Nov. 10, 1998

[54] SELF-TESTING TRANSCEIVER

[75] Inventor: Sanjay Kumar, Parisppany, N.J.

[73] Assignee: AT&T Corp, Middletown, N.J.

[21] Appl. No.: 693,685

[22] Filed: Aug. 12, 1996

[51] Int. Cl.[6] .................................................. H04B 17/00
[52] U.S. Cl. ............................................................ 455/67.4
[58] Field of Search ................................. 455/67.1, 67.3, 455/67.4

[56] References Cited

U.S. PATENT DOCUMENTS

| | | | |
|---|---|---|---|
| 4,780,885 | 10/1988 | Paul | 455/67.4 |
| 5,027,427 | 6/1991 | Shimizu | 455/67.4 |
| 5,457,812 | 10/1995 | Siira | 455/67.4 |
| 5,481,186 | 1/1996 | Heutmaker | 455/67.4 |
| 5,487,176 | 1/1996 | Yoneyama | 455/67.1 |

FOREIGN PATENT DOCUMENTS

B-78637/91  12/1991  Australia ............................... 455/67.4

*Primary Examiner*—Howard Britton
*Attorney, Agent, or Firm*—Alfred G. Steinmetz

[57] ABSTRACT

An integrated radio frequency transceiver comprising a diversity receiver and transmitter capable of performing a self test operation to determine if the receiver and transmitter paths are properly operational. The diversity receiver includes two receiver paths, a first path for receiving radio communications having a permitted bandpass, and a second receiver path for receiving radio signals from other radio port channels in use to assist in constructing its own neighbor list.

18 Claims, 2 Drawing Sheets

5,835,850

SELF-TESTING TRANSCEIVER

FIELD OF THE INVENTION

The present invention relates generally to the field of radio frequency transceivers and more particularly to a radio frequency transceiver incorporating self-testing capabilities.

BACKGROUND OF THE INVENTION

One application for the use of Radio Frequency (RF) transceivers is to transmit and receive RF signals for radio ports used in wireless communications systems. Presently, these radio frequency transceivers adapted for radio port use within a wireless communication system are not integrated units with respect to the performance of certain important functions. For instance, vital functions, such as self-testing of the transceiver, are performed by various other external hardware components. Moreover, these other external components may be utilized to measure those radio channels in use by other nearby radio ports to assist in neighbor list construction of a radio port. This reliance on external components used in connection with present day transceivers leads to higher design costs due to the increased complexity of an interface between the transceiver and the external components and the inclusion of the external components themselves. Such a design may also increases the chances for radio port failure leading to higher maintenance costs.

Accordingly, there is a need for a fully integrated transceiver unit which performs vital transceiver functions such as self-testing and measuring active radio channels from other radio transceivers internally without reliance on other external components.

SUMMARY OF THE INVENTION

In accordance with the present invention, there is disclosed an integrated radio frequency transceiver comprising a diversity receiver and transmitter capable of performing a self test operation to determine if the receiver and transmitter paths are properly operational. The diversity receiver includes two receiver paths, a first path for receiving radio communications having a permitted bandpass, and a second receiver path for receiving radio signals from other radio frequency transceivers.

The transmitter includes a quadrature modulator adapted to receive local oscillator signals from a frequency synthesizer and an intermediate frequency synthesizer for generating proper transmission frequencies. The transmit path of the transmitter is duplexed via a bandpass filter with the second receiver path. A frequency synthesizer also supplies a local oscillator signal for a mixing process in the first receiver path. The first receiver path, which includes two parallel bandpass paths for receiving two frequency ranges, also receives a local oscillator signal from the frequency synthesizer for mixing with an incoming signal.

For self-testing purposes, the transmitter is adapted to transmit a test signal which is routed by an internal switch to each of the receiver paths. An accurate reception of the test signal indicates properly operational transmitter and receiver paths. The second alternate receiver path, permits the radio frequency transceiver to detect radio signals from other radio frequency transceivers in the wireless communications system to maintain a list of active radio frequency transceivers.

BRIEF DESCRIPTION OF THE DRAWINGS

A more complete understanding of the present invention may be obtained from consideration of the following description in conjunction with the drawings in which.

DETAILED DESCRIPTION

Figure 1:
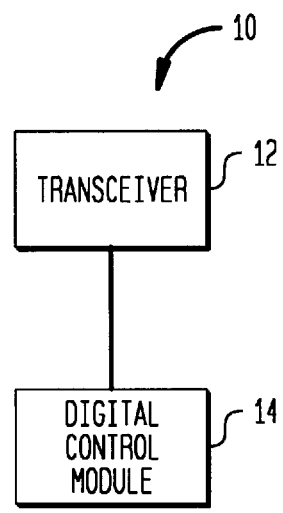
FIG. 1 is a schematic block diagram showing one exemplary embodiment of an intelligent radio port according to the present invention.

Referring now to FIG. 1 there is shown a schematic block diagram of an Intelligent Radio Port (IRP) unit 10 module 10 in accordance with the present invention. As shown, the IRP unit includes a transceiver module 12 which is coupled to a digital control module 14. As would be understood by a person skilled in the art, in the shown embodiment the transceiver module 12 is a single board transceiver that is a part of the Intelligent Radio Port (IRP) unit 10. The primary function of the transceiver module 10 is to transmit and receive digitally modulated radio frequency (RF) control signals and information signals to and from mobile wireless communications devices. As will be explained, the transceiver has built-in test circuitry in order to test itself in response to signals generated from the digital control module 14. In addition, the transceiver 12 is capable of detecting radio frequency interference signatures from other intelligent radio ports (IRPs) i.e., sniffing, to thereby construct a neighbor list of these nearby radio ports.

Figure 2:
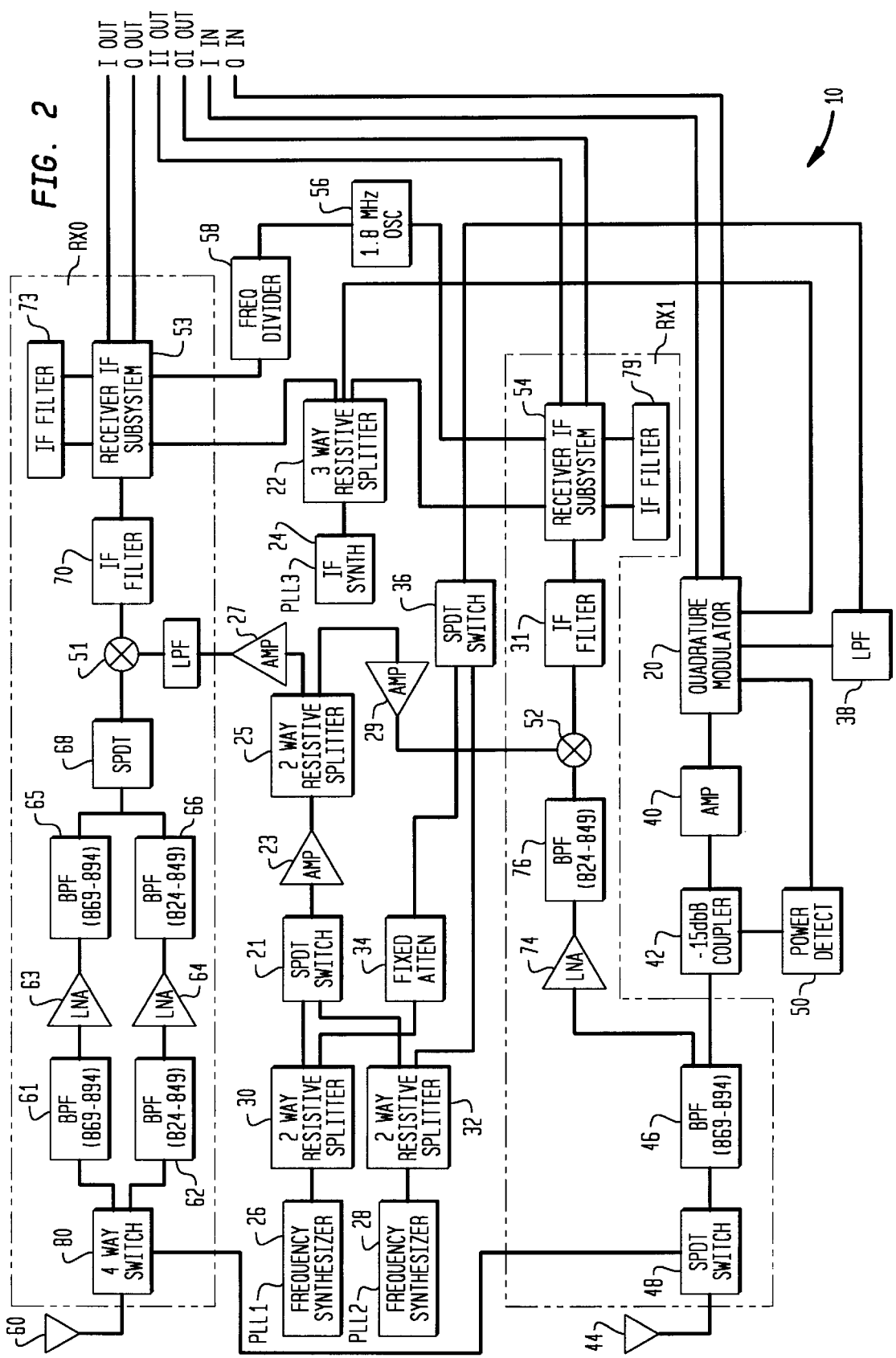
FIG. 2 is a schematic block diagram of one exemplary embodiment of an integrated transceiver module according to the present invention.

Referring to FIG. 2, the transceiver 12 is shown as an RF circuit module that is part of an intelligent radio port of a wireless communications system. In one preferred embodiment, the transceiver transmits in the 869 to 894 MHz and can receive in either the 824 to 849 MHz band or 869 to 894 MHz band, however as would be understood by a person skilled in the art, other bands may also be utilized. The operational capabilities of the transceiver enable the device to perform in the following functional modes: transmitter, diversity receiver, synthesizer, self-test, and sniffing mode, each of which modes will be discussed in greater detail herein.

As set forth herein, the present description addresses only the radio frequency signal processing aspect of the invention, as performed by the transceiver 12. The digital control portion of the transceiver is provided by the digital control module (shown in FIG. 1), which is adapted to interface with the transceiver module 12, as would be understood by a person skilled in the art. All signals except the two RF signals directly interface to the digital control module board.

Referring still to FIG. 2, the transmitter portion of the present invention transceiver includes a quadrature modulator 20 which operates for example at 5.0 volts and produces a power output of approximately −3 dBm (decibels below 1 milliwatt). Quadrature modulation, i.e., the modulation of two carrier components 90 degrees apart in phase by separate modulating functions, is well known to those skilled in the art. In the context of the present invention, such modulation signals are referred to as $I_{IN}$ and $Q_{IN}$ signals for transmission operations and $I_{OUT}/I1_{OUT}$ and $Q_{OUT}/Q1_{OUT}$ signals for receive operations. The quadrature modulator 20 of the present invention includes a built in power control wherein output power can be attenuated by approximately 50 dB. A complementary metal oxide semiconductor/transistor transistor logic (CMOS/TTL) compatible input allows the device to go into power down mode when less than 10 micro-amps supply current is consumed. The quadrature modulator of the present invention can be found, for example, in a single chip integrated circuit package model No. W2011 from AT&T Corp.

In the shown embodiment of FIG. 2, the quadrature modulator 20 is a direct conversion modulator with a built in offset mixer which prevents an external voltage controlled oscillator (VCO) from being pulled down by a large transmit signal. The transmitter requires low level local oscillator (LO) signals to eliminate the use of an amplifier on the synthesizers. The transmitter receives one LO signal at 82.2 MHz, via a 3-way splitter 22, from an intermediate frequency (IF) synthesizer 24. The transmitter also receives another LO signal at 745–770 MHz or 787–811 MHz from agile frequency synthesizers 26, 28 based on the transmit frequency thereby enabling outputs of the upper sideband to produce the desired frequency. As can be seen, the LO signals from the agile synthesizers 26, 28 arrive via resistive splitters 30, 32 a fixed attenuator 34, SPDT switch 36 and a low pass filter 38. The use of frequency synthesizers, which provide multiple frequency outputs, are well known to those skilled in the art. As would be understood, the agile frequency synthesizers 26, 28 utilized herein, may be programmed and controlled by a processor, for example, a microprocessor (not shown), to achieve the desired LO signals.

In one preferred embodiment of the present invention, the output from the quadrature modulator 20 is input to the first stage of an amplifier 40 which boosts the output signal by a given amount, e.g., 18 dB. The output of this amplifier 40 enters a final power amplifier stage (not shown) which adds another 7 dB of gain to this signal. The output of the amplifier 40 next enters a −15 dB directional coupler 42 to monitor the power output to antenna 44. That is, after traveling through a bandpass filter (BPF) duplexer 46 and SPDT switch 48, the $I_{IN}/Q_{IN}$ processed power signal is directed out to the antenna 44 to be radiated. The SPDT switch 48 directs the RF power to the antenna 44 or other receiver paths for loopback tests as will be described.

The intelligent radio ports used with the present invention integrated transceiver 12 require the transmit power to be reduced in 4 dB steps from the maximum rated transmit power the transceiver can transmit. To achieve a flat characteristic independent of the gain spread in the amplifier stages, a power leveling loop, including power detector 50, external to the amplifier 40 is used. The output of the transmitter is adjusted by changing the control voltage to a gain control input of the transmitter. A pulse width modulation (PWM) signal, from a microcontroller within the power detector, is low pass filtered to produce such a DC control signal. The transmitter can then be calibrated by using an external power meter to find a corresponding PWM number for each power level. A problem, however, is that with small variations in gain or load impedance, the power output can fluctuate as well. Also if the antenna 44 is accidentally removed with the unit in operation, reverse power may damage the unit. To address this problem, the power feedback loop fed into the −15 dB directional coupler 42 is adapted to sense the reverse power and rectify it. This signal is, in effect, added to the DC control signal output from the microcontroller. Accordingly, the loop will settle such that the output of the detector diode in the directional coupler 42 will be equal to the reference level. The reference level is then derived directly from the microcontroller and is set according to the required output power.

As would be understood, one must be careful to recognize that for the self-test purposes the transmitter transmits at 824–896 MHz, but the input to the bandpass filter (BPF) duplexer 46 accepts frequencies only from 869–894 MHz, which causes a loss of signal that could be as high as 60 dB. Therefore, for each transceiver unit calibration the exact signal arriving at the receiver must be found. Also, the channel used for making the self-test should preferably be the channel not used by the mobile wireless communication devices.

Regarding the diversity receive function of the transceiver 12, it would be understood that the receiver is to receive digitally modulated RF control and information signals from mobile wireless communication devices and deliver baseband signals to a baseband processing unit. The receiver handles signals from −15 dBm to −102 dBm or 87 dBM of dynamic range. The receiver employs a double heterodyne approach in each of the receive channels, i.e. two mixing processes, one at mixer 51, 52 and another at the receiver IF subsystems 53, 54, respectively. Two intermediate frequencies are used, one at 82.2 MHz from the agile frequency synthesizers 26, 28 and the IF synthesizer 24, and another at 455 kHz. The intermediate frequencies from the agile frequency synthesizers follow paths through the resistive splitters 30, 32 to switch 21, to amplifier 23 to splitter 25 through amplifiers 27, 29 to either mixer 51 or mixer 52, respectively. The local oscillator source for the 455 kHz frequency is derived from a crystal oscillator 56 at 1.82 MHz, which is frequency divided by four at frequency divider 58 prior to input at the receiver IF subsystems.

The diversity receiver consists of two identical receivers, a first receiver RXO and second receiver RX1. Both RXO and RX1 include RF amplification, downconversion, IF bandpass filtering, IF amplification, gain control, demodulation and baseband circuits. As can be seen, both the RXO and RX1 receiver, include like components. The RXO path, specifically, includes antenna 60, BPF 61 to LNA 63 to BPF 65 or BPF 62 to LNA 64 to BPF 66, SPDT switch 68, MIXER 51, IF Filter 70 to Receiver IF Subsystem 53 in conjunction with IF filter 73, to provide $I_{OUT}$ and $Q_{OUT}$ signals. The RX1 Path, specifically, includes antenna 44, SPDT switch 48, BPF duplexer 46, LNA 74, BPF 76, Mixer 52, IF Filter 78 to Receiver IF Subsystem 54 in conjunction with IF Filter 79, to provide $I1_{OUT}$ and $Q1_{OUT}$ signals.

Regarding the RXO receiver, the RF amplification circuit includes a 4-way switch 80 which can connect the received signal to the appropriate receive path bandpass filter (BPF), i.e. 869–894 (MHz) or 824–849 (MHz), respectively. The switch 80 can also route a self-test signal from the transmitter to the 869–894 MHz bandpass filter 61. These signals, amplified by the low noise amplifier (LNA) 64 which has a typical noise figure of about 3 dB, and the LNA 63 which has a noise figure of about 2.5 dB, are routed to the mixer 51 by the SPDT switch 68. The LNA 64 has a 1 dB compression point of 21 dBm to address high level band B signals without saturating the amplifier, as would be understood by a person skilled in the art.

The down converter circuit of the RXO receiver includes a double balanced mixer 51 which combines the incoming receive signals from the RF amplification circuit with an agile LO frequency to produce the first IF at 82.2 MHz. A second mixer in the IF subsystem 53 combines the first IF at 82.2 MHz with an 82.2 MHz LO frequency from IF Synthesizer 24 to produce a third IF at 455 kHz. Finally this 455 kHz signal is mixed with a fixed 455 kHz LO to produce Iout an Qout signals.

The IF bandpass filter 70 of the RXO receiver provides the channel separation function for the receiver. In the shown embodiment, the 3 dB bandwidth of the filter is 30 kHz. As would be understood by a person skilled in the art, the filter 70 passes the tuned channel and rejects all other channels. A first IF filter 70 is an 82.2 MHz surface acoustic wave filter and requires input/output matching to 50 ohms. The other IF bandpass filter 73 is at 455 kHz with a 3 dB bandwidth of 28 kHz and 20 kHz respectively. This filter 73 is preferably a ceramic filter with low group delay response, the nominal impedance being 1000 ohms to 1500 ohms.

The receiver IF subsystem 53 is a low power IF subsystem for operation at IF frequencies as high as 500 MHz and second IF frequencies as high as 22 MHz. The subsystem 53, preferably includes a mixer, IF amplifiers, I and Q demodulators, a phase locked quadrature oscillator, an automatic gain control (AGC) detector, and a biasing system with external power down, where in one preferred embodiment the subsystem is an AD607 single chip IC from Analog Devices, Inc. The IF subsystem includes a low noise high intercept input mixer that is a doubly balanced Gilbert-Cell type and operates linearly for RF inputs spanning −102 to −15 dBm. The mixer section also includes a local oscillator preamplifier, which lowers the drive to −16 dBm. The single sided IF output can directly drive a bandpass filter with an impedance of 200 ohm or greater. A gain control input can serve as either manual gain input or an automatic gain control voltage-based radio signal strength indicator (RSSI) output.

The diversity receiver path RX1 is similar to receive path RXO, except for the 2-way SPDT 48 switch that can route the transmit signal to either the antenna 44 or to the RXO receiver path for a self-test. The BPF based duplexer 46 provides isolation between the transmit and receive paths.

As shown in FIG. 1, the synthesizer functional group of the present invention transceiver 12 consists of an agile IF synthesizer 24 providing an 82.2 MHz LO source, a fixed 1.82 MHz crystal oscillator 56 which is divided by four to produce the 455 kHz signal and two frequency agile synthesizers 26 and 28. All three synthesizers 24, 26, and 28 (of FIG. 2) are programmed and controlled by a microprocessor (not shown), so that the outputs from the frequency synthesizers are coherently locked to a reference frequency of 15 MHz. The chip used for phase locked loop (PLL) operation is preferably an LMX 2332 from National Semiconductor Corp. which has dual synthesizers including prescalers. Each chip is used to generate one RF and one IF local oscillator signal. Since the transceiver has to transmit at two different bands and receive at two different bands. The number of PLLs required will be at least four if a direct upconversion transmitter is used. In the shown embodiment an offset transmitter is used so that only two RF LOs are required.

As has been discussed, transceiver 12 of the present invention may operate in a self-test mode, in which the receiver essentially tests itself on command from a central processing unit on the digital control module to find any failed components in the transmit or receive path. The transmitter transmits a test signal, for instance a specially encoded message, from 824–849 MHz which is routed by the SPDT switch 48 to both the receivers RXO and RX1. A detection by the processing unit of a successful reception of the test signal at a separate port of the digital control module for each receiver indicates proper operating transmit and receive paths in the transceiver 10. Although the duplexer filter 46 at the transmit output is from 869–894 MHz, the filter will still pass the test signal with about 60 dB of attenuation, sufficient for test purposes. Another unique feature of the present invention is that the transmit signal is generated from heterodyning the receive local oscillator with the 82.2 MHz IF signal which in turn eliminates the use of two synthesizers.

The present invention transceiver may also operate in a sniffing mode to detect radio interference signatures from other intelligent radio ports (IRPs). The SPDT switch 48 is operable to route RF transmissions received from other IRPs to the alternate receive path RX1. Based on this received signal at the control module each IRP maintains a list of active IRPs in the neighborhood which is stored in memory in the control module. Since the signals from the other IRPs are not going to be very large a low noise amplifier 74 used in this path can have a low 1 dB compression point, therefore, an appropriate low noise amplifier is used.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed:

1. An integrated radio frequency transceiver apparatus adapted for use with a radio port utilized for communication within a wireless communication system, comprising:

a transmitter operable for transmitting radio frequencies within a given frequency band;

a diversity receiver having first and second receiver paths for receiving radio frequencies within a given frequency band, said transmitter being operable transmit a self-test signal for receipt over at least one of said first and second receiver paths in response to a self-test command, wherein a receipt of said self-test signal from said at least one receiver path verifies proper operation of said transmitter and said at least one receiver path, said first receiver path receiving communications signals intended for said radio port and said second receiver path receiving communications signals transmitted from transceivers of other radio ports whereby a neighbor of said other radio ports may be maintained based on reception of said communication signals for other radio ports.

2. The apparatus according to claim 1, further including a digital control module coupled to said transmitter and said receiver, said digital control module operable to generate said self-test command and to receive said self-test signal.

3. The apparatus according to claim 1, wherein said transmitter and said second receive path are coupled to a bandpass filter duplexer and switch combination, wherein said duplexer and switch combination enable communications signals to be transmitted and received over a single transmit/receive channel.

4. The apparatus according to claim 1, wherein said diversity receiver further includes:

a frequency synthesizer; and a heterodyne mixer coupled to said frequency synthesizer, wherein said frequency synthesizer is operable to supply a local oscillator signal to said heterodyne mixer for generating said radio frequencies in said diversity receiver.

5. The apparatus according to claim 4, wherein said transmitter further includes a quadrature modulator, and wherein said frequency synthesizer is further operable to supply a local oscillator signal to said quadrature modulator for generating said radio frequencies in said transmitter.

6. The apparatus according to claim 5, wherein said transmitter further includes an intermediate frequency synthesizer operable to supply a local oscillator signal to said quadrature modulator for generating said radio frequencies in said transmitter.

7. The apparatus according to claim 6, wherein said diversity receiver further includes an intermediate frequency receiver subsystem, said intermediate frequency synthesizer being further operable to supply a local oscillator signal to said intermediate frequency receiver subsystem in said diversity receiver.

8. The apparatus according to claim 2, wherein said transmitter further includes a quadrature modulator for modulating said communications signals generated from said transceiver, said transmitter further including a directional coupler and power detector coupled to said quadrature modulator for providing a power leveling loop for transmitted signals of said transceiver, said power leveling loop operable to produce a flat transmission characteristic for said transmitted signals independent of gain spread from associated amplifier stages.

9. The apparatus of claim 8, wherein said power detector produces a pulse width modulation (PWM) control signal for input to a gain control input of said transmitter, whereby said gain control input adjusts the output of said transmitter in response to said control signal.

10. The apparatus of claim 8, wherein said directional coupler is adapted to sense a reverse power signal input thereto and rectify said reverse power input signal, wherein the rectified reverse power input signal is added to said PWM control signal.

11. The apparatus according to claim 1, wherein said first receiver path includes a first and second subpath, wherein said first subpath includes one or more bandpass filters for receiving radio frequency signals in a first predetermined passband and said second subpath includes one or more bandpass filters for receiving radio frequency signals in a second predetermined passband.

12. The apparatus of claim 11, wherein said first passband is in the range of 824–849 MHz and said second passband is in the range of 869–984 MHz.

13. The apparatus according to claim 1, further including an intermediate frequency receiver subsystem in said diversity receiver for providing a second stage heterodyne mixing process for generating said radio frequencies within said given frequency band.

14. The apparatus according to claim 13, wherein said intermediate frequency receiver subsystem is utilized in said at least two receiver paths of said diversity receiver, a first path for receiving radio communications targeted for said radio port and an alternate receiver path for detecting radio signals transmitted by other radio frequency transceivers.

15. The apparatus of claim 1, wherein said self-test signal for said first and second receiver paths is received at a separate corresponding port of said digital control module.

16. An integrated radio frequency transceiver apparatus adapted for use with a radio port utilized for communications within a wireless communication system, comprising:
  a transmitter operable for transmitting radio frequencies within a given frequency band;
  a diversity receiver for receiving radio frequencies within a given frequency band, said transmitter being operable to transmit a self-test signal for receipt at a first receiver path therein in response to a self-test command, wherein a receipt of said test signal verifies proper operation of said transmitter and said receiver path;
  wherein said diversity receiver path includes a second receiver path; wherein said first receiver path is for receiving communications signals intended for said radio port and said second receiver path is for receiving communications signals transmitted from transceivers of other radio ports, whereby a neighbor listing of other radio ports may be maintained based on reception of said communications signals for other radio ports.

17. The apparatus according to claim 16, further including a digital control module coupled to said transmitter and said receiver, said digital control module operable to generate said self-test command and to receive said self-test signal.

18. The apparatus of claim 17, wherein said self-test signal can be generated to said second receiver path, wherein said test signal for each receiver path is received at a separate port of said digital control module.

* * * * *